United States Patent [19]

Kurosawa et al.

[11] Patent Number: 4,628,548
[45] Date of Patent: Dec. 16, 1986

[54] DEVICE AND METHOD OF MOVING AND CONTROLLING THE POSITION OF A SLIDABLE BODY SUCH AS USED FOR BODY CLEANSING

[75] Inventors: Masahiro Kurosawa; Shigeru Niki; Shigenari Kadomatsu; Motoki Moroi; Takao Yuasa, all of Yokohama; Masami Iida, Chigasaki; Tetsuhiro Katamune, Kitakyushu; Akiyoshi Seki, Kitakyushu; Kazutaka Ide, Kitakyushu, all of Japan

[73] Assignee: Toto Ltd., Kitakyushu, Japan

[21] Appl. No.: 740,127

[22] Filed: May 31, 1985

[30] Foreign Application Priority Data

Mar. 23, 1985 [JP] Japan .................. 60-041817
Mar. 31, 1985 [JP] Japan .................. 60-067885
Mar. 31, 1985 [JP] Japan .................. 60-067886

[51] Int. Cl.$^4$ .................. A47K 3/20; A47K 4/00; E03D 9/08
[52] U.S. Cl. .................. 4/420.4; 4/420.1; 4/420.5; 4/443; 4/447; 4/448
[58] Field of Search .................. 4/447, 443, 448, 444, 4/420.2, 420.1, 420.5, 420.4, 420.3, 492, 490

[56] References Cited

U.S. PATENT DOCUMENTS

| | | | |
|---|---|---|---|
| 1,935,201 | 11/1933 | Callejo | 4/448 |
| 3,575,729 | 4/1971 | Howard | 4/490 |
| 4,136,407 | 1/1979 | Maurer | 4/448 |
| 4,208,746 | 6/1980 | Minamoto et al. | 4/448 |
| 4,449,260 | 5/1984 | Whitaker | 4/492 X |
| 4,551,868 | 11/1985 | Kawai et al. | 4/443 |

Primary Examiner—Henry K. Artis
Attorney, Agent, or Firm—Jordan and Hamburg

[57] ABSTRACT

A device for moving a cleansing nozzle connected to a water supply system includes an elongated nozzle, a cylinder in which the nozzle is axially slidable, a motor having an output shaft, a drum body mounted on the output shaft, the drum body having a cylindrical rim surface and a sectoral recess extending from the surface, a sectoral insert disposed in the recess and having a partial cylindrical surface conforming to and forming a continuation of the cylindrical rim surface, and a leaf spring having one end connected to the nozzle and the other end held between the drum body and the sectoral insert such that rotation of the drum body extends and withdraws the nozzle longitudinally as the leaf spring unwraps and wraps around the drum body. The method includes counting the number of cycles of the frequency of the electric power supplied to the motor, determining the actual position of the nozzle on the basis of the counted pulses, establishing a predetermined position of the nozzle, comparing the actual position with the predetermined position, and transmitting the results of the comparison to a power circuit for the motor to turn the motor on and off so that the motor thereby positions the slidable nozzle at the predetermined position.

15 Claims, 17 Drawing Figures

① OUTPUT VOLTAGE OF THE FIRST HALL IC: $H_1$

② OUTPUT VOLTAGE OF THE FIRST HALL IC: $H_2$

③ OUTPUT VOLTAGE OF THE FIRST HALL IC: $H_3$

DEVICE AND METHOD OF MOVING AND CONTROLLING THE POSITION OF A SLIDABLE BODY SUCH AS USED FOR BODY CLEANSING

BACKGROUND OF THE INVENTION

1. Field of the Invention

This invention relates to a device for moving a slidable body forward or backward and a method of controlling the position of the slidable body. More particularly, it is concerned with a device for moving a nozzle in a part cleaning device for washing the anus and functioning as a bidet and a method of controlling the position of the nozzle. The term "part cleaning device" as herein used means an apparatus including a tank for cleaning water, a cleaning nozzle which is movable between its retracted position and its cleaning position, a system for heating the cleaning water, a system for supplying the heated cleaning water, a system for moving the nozzle and devices for controlling those systems, and provided at the rear end of a water closet for directing a jet of heated cleaning water toward the private parts through the nozzle in its cleaning position.

2. Description of the Prior Art

In the part cleaning device, it is usually the case that the nozzle has two cleaning positions, i.e., the position for cleaning the anus and the position for functioning as a bidet.

There are known two arrangements for moving the nozzle forward from its retracted position to its cleaning positions and backward.

One of them relies on the pressure of cleaning water for moving the nozzle forward. The nozzle is slidably disposed in a cylinder and the cleaning water is introduced into the cylinder to push the nozzle out of the cylinder to either of its cleaning positions. A spring is connected to the nozzle for urging the nozzle back to its retracted position in the cylinder.

The other arrangement employs a motor which is rotatable in either direction for moving the nozzle out of, or into, a cylinder. This arrangement will hereunder be described with reference to FIG. 16.

Figure 16:
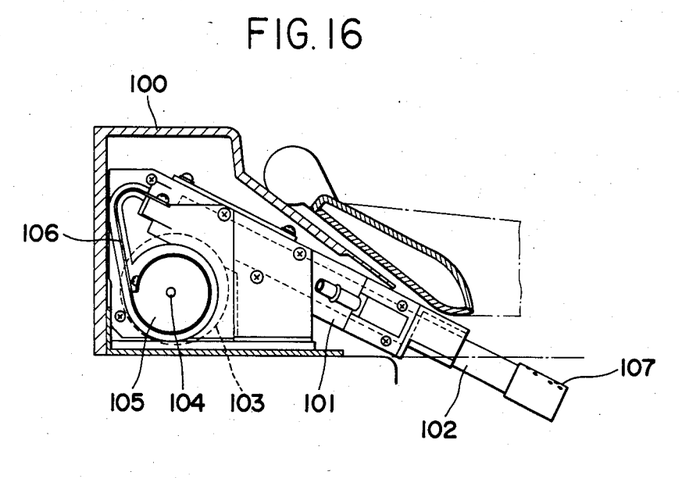
FIG. 16 is a longitudinal sectional view of a conventional nozzle device.

The cylinder 101 is secured in a casing 100 located adjacent to the rear end of a toilet stool (not shown). The nozzle 102, which comprises a tubular body, is axially slidable in the cylinder 101. The electric motor 103 is provided adjacent to the proximal end of the cylinder 101 for moving the nozzle 102 forward or backward. The motor 103 has an output shaft 104 to which a cylindrical drum 105 is secured. A leaf spring 106 has one end wound on, and fastened to, the outer cylindrical surface of the drum 105. The other end of the spring 106 is connected to the proximal end of the nozzle 102. The output shaft 104 of the motor 103 is rotatable in two directions and the manner of the rotations of the output shaft 104 causes the reciprocal motion of the nozzle 102 in the cylinder 101. When the nozzle 102 is brought to its cleaning position, it directs a jet of cleaning water toward the private parts of a person using the toilet through its end openings 107. The positioning of the conventional nozzle 102 structure is effected by a feedback control system including a sensor of, for example, the magnetic or optical type which is located in a position for monitoring the motion of the nozzle 102. The sensor detects the amount of motion of the nozzle 102 and transmits a corresponding signal to the motor 103 to turn the power circuit of the motor 103 on or off.

The system relying on the pressure of the cleaning water for positioning the nozzle has the disadvantage that if the water pressure is lower than a predetermined level, the nozzle fails to reach its designated cleaning position and accomplish its proper cleaning function. If the nozzle is of the type having two cleaning positions for the anus and for the use as a bidet, respectively, its internal water passages formed in the nozzle 102 itself are complicated and the size of the nozzle 102 is undesirably enlarged.

The system employing the motor 103 for moving the nozzle 102 and the sensor for detecting and positioning it has the disadvantage that its nozzle positioning accuracy depends on the performance of the sensor. If the sensor fails to function accurately, the nozzle 102 fails to reach its designated cleaning position and also to accomplish its proper cleaning operation as mentioned above.

Figure 17:
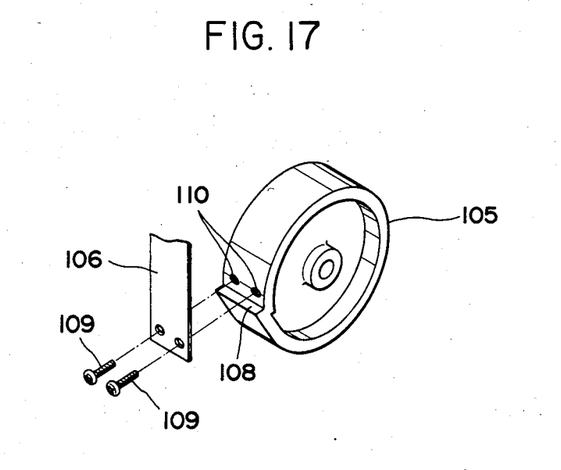
FIG. 17 is a perspective view of a conventional drum for driving the nozzle.

The sensor requires a complicated job of assembly including wiring connection between the motor 103 and the control system and mounting in a predetermined narrow space, and the control system also becomes complicated. The drum 105 has, as shown in FIG. 17, formed on its outer cylindrical surface a shoulder 108 and threaded holes 110 provided in the vicinity of the shoulder 108 for receiving screws 109 for securing the leaf spring 106. Thus, the outer cylindrical surface of the drum 105 on which the leaf spring 106 is wound does not have a uniform curvature. As the drum 105 is rotated alternately in the opposite directions, the leaf spring 106 is wound on the surface of the drum 105 and unwound therefrom repeatedly. Insofar as the surface of the drum 105 does not have a uniform curvature, with the passage of time the fatigue of the leaf spring 106 is not uniform along its length, and this causes stress concentration or buckling in the leaf spring 106 which leads to failure in driving the nozzle 102. The fastening of the leaf spring 106 to the drum 105 by the screws 109 adds to the amount of labor required for the fabrication of the apparatus and hence the cost thereof.

Another problem that the conventional part cleaning device involves is due to the fact that the distal end portion of the nozzle 102 which is provided with the openings 107 projects from the cylinder 101 even when the nozzle 102 is in its retracted position. The projecting distal end portion of the nozzle 102 is always liable to contamination by dirty liquid or matter, whether the nozzle 102 may be in its cleaning or retracted position. The dirty liquid and matter are likely to form powder on the projecting end portion of the nozzle 102 and in its openings 107 and thereby to block the openings 107. They have an objectionable odor, and contaminate cleaning water.

SUMMARY OF THE INVENTION

It is an object of this invention to solve the problems hereinabove pointed out in connection with the movement of a slidable body and more particularly the positioning of a cleaning nozzle in a part cleaning device, and to improve the accuracy of the nozzle positioning by employing an open-loop control system not relying on any kind of sensors.

It is another object of this invention to improve the slidable body moving device which includes a drum secured to the output shaft of an electric motor and a leaf spring, so that the connection of the spring to the drum may be simplified, and so that the smooth and proper function of the spring may always be ensured.

It is still another object of this invention to enable the self-cleaning of the exposed distal end portion of the nozzle in a part cleaning device and at the same time the cleaning of the head of its extensible nozzle member both before and after its use to keep it always clean.

The first object of this invention is attained by a device for driving a slidable nozzle in a part cleaning device which comprises an electric motor adapted for rotation synchronously with the frequency of a power source or a pulse, such as a synchronous motor, pulse motor or servomotor, means for counting the number of cycles of the frequency of the power source for the motor, means for determining the actual position of the nozzle based on the counted number of cycles, and means for comparing the actual position of the nozzle with its predetermined cleaning or retracted position, the output of the comparing means being transmitted to a power circuit for the motor to effect the ON-OFF control thereof for moving the nozzle to its cleaning or retracted position.

The output shaft of the motor has a specific rotating speed or angle relative to the frequency of its power source. Therefore, the nozzle has a specific amount of axial direction movement in either direction depending on the direction of the rotation of the output shaft of the motor. It is, therefore, possible to determine the actual position of the nozzle if the number of cycles of the frequency of the power source is counted simultaneously with the rotation of the output shaft of the motor. The actual position of the nozzle is compared with its predetermined cleaning or retracted position stored in the comparing means, and as soon as the former coincides with the latter, the power circuit for the motor is turned off so that the nozzle may be stopped in its predetermined cleaning or retracted position.

The second object is attained by an improved device for driving a slidable nozzle in a part cleaning device which comprises a cylinder, a nozzle having at a distal end thereof openings through which cleaning water is directed outwardly, an electric motor for moving the nozzle axially in either direction in the cylinder, a drum secured to the output shaft of the motor and a leaf spring connecting the drum and the nozzle, and characterized in that the drum comprises a main body portion having a sectoral recess and a sectoral insert portion fitted in the sectoral recess and having an arcuate outer peripheral surface defining a precision cylindrical drum surface with the outer peripheral surface of the main body portion, and that one end of the leaf spring is secured between the mutually fitting surfaces of the main body and sectoral insert portions.

As the drum surface is precision round, the amount of the spring which is wound or unwound reflects the amount and angle of the rotation of the output shaft of the motor correctly, and the amount and angle of the rotation of the output shaft are transmitted to the nozzle highly accurately.

The third object is attained by a device including a nozzle having a flattened nozzle head and adapted for its complete retraction into a cylinder, a first packing member provided in the cylinder for sealing the peripheral surface of the nozzle when it is in its retracted position, a second packing member provided between the first packing member and the distal end of the cylinder and surrounding the nozzle head portion, and a cleaning water feed line connected to the cylinder between the first and second packing members, the nozzle head being temporarily stopped in a position projecting out of the distal end portion of the cylinder immediately before its arrival at its cleaning position and immediately after its departure therefrom so that the cleaning water may be discharged through an annular passage between the second packing member and the nozzle head portion for cleaning the distal end portion of the cylinder and the nozzle head.

Switches for starting the cleaning operation of the anus and the fucntion as a bidet are provided in a control panel for a part cleaning device. If either of those switches is turned on, the nozzle is temporarily stopped in a position suitable for the self-cleaning of the nozzle head. The electromagnetic valve or pump disposed in the cleaning water feed line works for a brief period of time to supply water from a hot water storage tank to the annular passage so that it may clean the nozzle head and the distal end of portion the cylinder before it is discharged into a toilet stool. Then, if the stop switch provided in the control panel is turned on, the nozzle starts retracting into the cylinder and stops temporarily at its self-cleaning position on its way again. The electromagnetic valve or pump works briefly and water is supplied from the hot water storage tank to the annular passage for cleaning the nozzle head itself and the distal end portion of the cylinder before the nozzle is moved to its completely retracted position in the cylinder.

DESCRIPTION OF THE PREFERRED EMBODIMENTS

Figure 1:
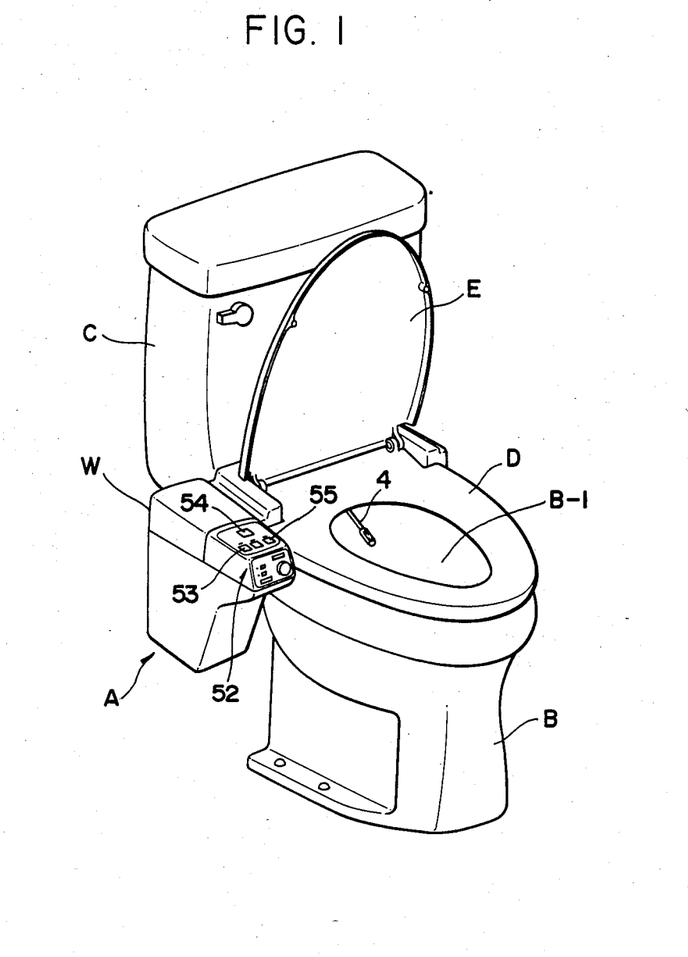
FIG. 1 is a perspective view of a water closet provided with a part cleaning device embodying this invention.
Figure 2:
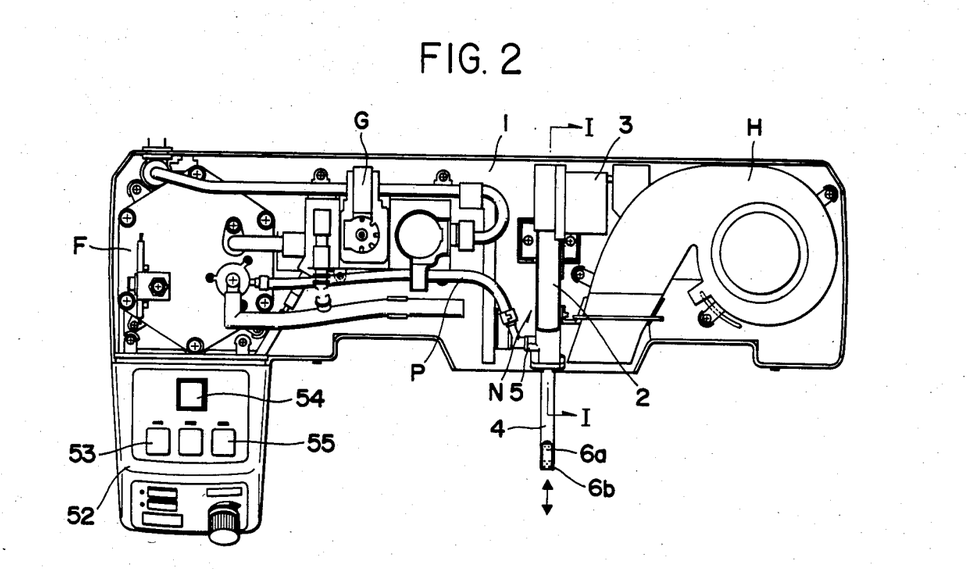
FIG. 2 is a schematic top plan view showing the interior of the device shown in FIG. 1.
Figure 3:
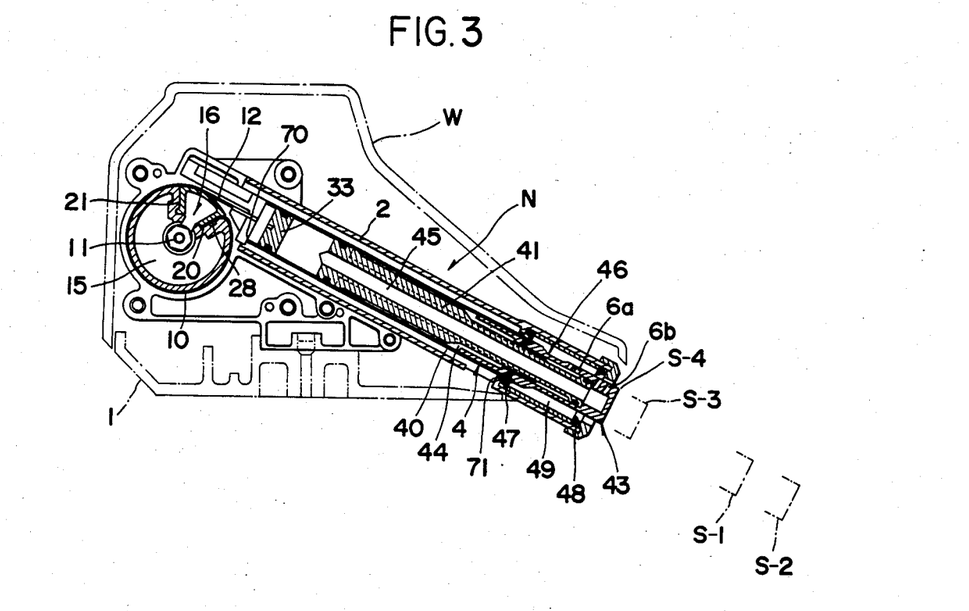
FIG. 3 is a sectional view taken along the line I—I of FIG. 2 and showing the longitudinal section of a nozzle device in a retracted position.
Figure 4:
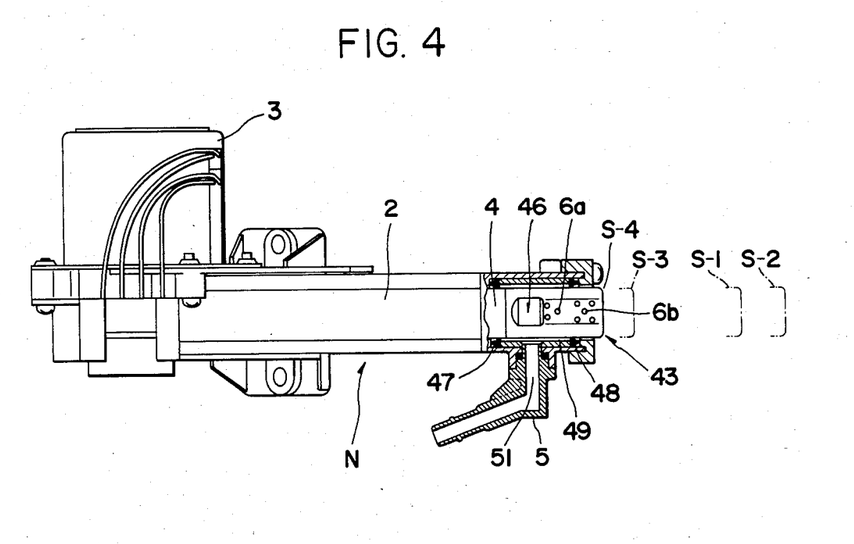
FIG. 4 is a top plan view, partly in section, of the nozzle device.

A water closet provided with a part cleaning device A embodying this invention is shown in FIG. 1 and comprises a toilet stool B, a flushing water tank C, a lavatory seat D and a lid E. The part cleaning device A comprises a base 1, a tank F for heating and storing cleaning water, a valve unit G for supplying the cleaning water, a hot air fan H for drying after cleaning and a nozzle device N located approximately in the center of the device and connected to the tank F by a cleaning water supply pipe P. The nozzle device N comprises a cylinder 2 secured on the base 1 and having a base end to which an electric motor 3 is integrally mounted, and a tubular nozzle body 4 provided axially movably in the cylinder 2, as shown in FIGS. 3 and 4. The motor 3 is a synchronous motor having an output shaft adapted for rotation synchronously with the frequency of a power source.

The cylinder 2 is provided at the distal end thereof with an elbow 5 for connection to the cleaning water supply pipe P. When the nozzle body 4 has been moved forward to its cleaning position, the elbow 5 communicates with a water passage formed in the nozzle body 4 so that a jet of cleaning water may be directed outwardly through a plurality of first and second end openings 6a and 6b.

Figure 5:
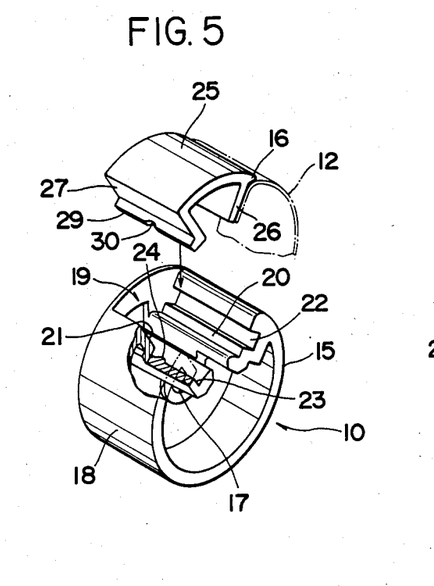
FIG. 5 is an exploded perspective view of a drum and a leaf spring.

A cylindrical drum 10 is secured to the output shaft 11 of the motor 3. A thin leaf spring 12 has its proximal end fastened to the drum 10 and the distal end of the leaf spring 12 is connected to the proximal end portion of the nozzle body 4. The drum 10 is formed from a synthetic resin. It comprises a main body portion 15 and an insert portion 16 for securing the leaf spring 12 integrally to the main body portion 15, as shown in FIG. 5. The main body portion 15 has a central boss 17 secured about the output shaft 11, and a major arc-shaped cylindrical outer peripheral or rim surface 18 formed with a sectoral recess 19. The recess 19 defines a pair of radial walls 20 and 21 which is substantially equal in length to the width of the rim surface 18. The wall 20 has a groove 22 and the wall 21 also has a groove 23. Both of the grooves 22 and 23 are in parallel to the axis of the drum 10. The groove 23 has a positioning projection 24 approximately at the middle thereof.

Figure 6:
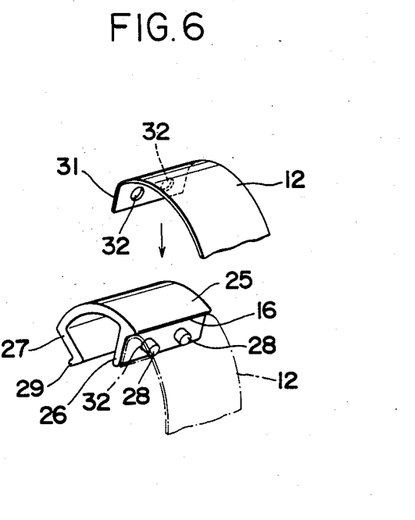
FIG. 6 is a perspective view showing the proximal end of the leaf spring secured to the drum.

The insert portion 16 has a sectoral cross section and can be fitted in the sectoral recess 19. The insert portion 16 has an arcuate outer peripheral or rim surface 25 and a pair of radial walls 26 and 27. The rim surface 25 has a radius of curvature which is equal to that of the rim surface 18 of the main body portion 15, and the rim surfaces 18 and 25 form a precision cylindrical surface when the insert portion 16 is fitted in the main body portion 15. The wall 26 is formed on its outer surface with a pair of projections 28 for engaging the leaf spring 12, as shown in FIG. 6. The wall 27 is provided at its radially inner edge with an outwardly directed flange 29 having approximately at the middle thereof a recess 30 in which the positioning projection 24 can be received.

The leaf spring 12 is so bent prior to assembly as to closely fit the wall 26 of the insert portion 16 and the rim surfaces 18 and 25, and has the bent end portion 31 formed with a pair of holes 32 for receiving the projections 28 on the wall 26, as shown in FIG. 6. The projections 28 extending through the holes 32 are fitted in the groove 22 of the wall 20 and the flange 29 is fitted in the groove 23 of the wall 21, as is obvious from FIG. 5. The other end of the leaf spring 12 is connected by a pin 33 to the proximal end portion of the nozzle body 4, as shown in FIG. 3.

If the output shaft 11 of the motor 3 is rotated in one direction, the leaf spring 12 is unwound from the rim surfaces 18 and 25 of the drum 10 to enable the nozzle body 4 to move forward to its cleaning position, and if the output shaft 11 of the motor 3 is rotated in the reverse direction, the leaf spring 12 is wound on the drum to enable the nozzle body 4 to return to its retracted position. Insofar as the drum 10 has a precision cylindrical surface defined by the rim surfaces 18 and 25, the leaf spring 12 is subjected to uniform compression or tensile stress along its entire length when it is being either wound or unwound around the drum 10. The leaf spring 12 always works smoothly without being subjected to any localization of stress concentration or buckling, and therefore has long life and good durability. The leaf spring 12 is easy to be secured to the drum 10, as it is sufficient to fit the insert portion 16 in the main body portion 15.

The nozzle body 4 is of the double-walled construction and comprises an outer tube 40 and an inner tube 41 disposed in the outer tube 40 coaxially therewith. Therefore, the nozzle body 4 has a first water passage 44 defined between the outer and inner tubes 40 and 41, having an annular cross section and leading to a nozzle head 43 at the outer end of the outer tube 40, and a second water passage 45 extending through the inner tube 41 and leading to the nozzle head 43. The nozzle head 43 is provided at its top with three or five first jet openings 6a and second jet openings 6b, though the number of those openings may have to be selected to provide the force of water required for cleaning the anus or the function for a bidet. The nozzle head 43 is flattened on the top and the bottom by a pair of shoulders 46 dividing it from the rest of the nozzle body 4.

The cylinder 2 is provided inwardly of its outer distal end portion with a first packing member 47 and a second packing member 48 both having a Y-shaped cross section and surrounding the nozzle head 43 therebetween when the nozzle body 4 is in its completely retracted position. The packing members 47 and 48 and the shoulders 46 on the nozzle head 43 define an annular passage 49 in the cylinder 2. The annular passage 49 is connected to the passage 51 in the elbow 5 which is connected to the cleaning water supply pipe P leading to the tank F. The outer tube 40 has first and second water inlet openings (not shown) through which the annular passage 49 is connected to the first and second water passages 44 and 45 to supply cleaning water into the nozzle body 4 when it is in its cleaning position.

The nozzle device N including the nozzle body 4 is secured to the base 1 in a casing W in such a way that the nozzle body 4 may be axially movable into the bowl B-1 of the toilet stool B. The jetting of the cleaning water from the nozzle device N is started by a cleaning start switch 53 and a start switch for a bidet 55 provided on a control panel 52 and stopped by a stop switch 54 also provided on the control panel 52.

The nozzle body 4 can be stopped at three cleaning positions, i.e., the anus cleaning position S-1, the position for functioning as a bidet S-2 and self-cleaning position S-3. When the nozzle body 4 is in its first stop position S-1 by the operation of the cleaning start switch 53, cleaning water flows from the annular passage 49 to the first jet openings 6a through the first inlet opening (not shown) and the first water passage 44 for cleaning the anus. When the nozzle body 4 is in its second stop position S-2 by the operation of the start switch for a bidet 55, water flows from the annular passage 49 to the second jet openings 6b through the second inlet opening (not shown) and the second water passage 45 for the use as a bidet. The supply of cleaning water from the tank F may be effected by a known device, i.e., by an electromagnetic valve in the valve unit G if water is supplied directly, or by an electromagnetic pump (not shown) if it is supplied indirectly.

According to a salient feature of this invention, the electromagnetic valve or pump is in operation for a brief period of time immediately after the nozzle body 4 has been temporarily stopped at its self-cleaning position S-3, and immediately after it has been retracted toward the cylinder 2 and stopped temporarily at its self-cleaning position S-3 again. This is a very short period of, say, one to several seconds required for cleaning the nozzle head 43 and the adjacent end of the cylinder 2.

Figure 7:
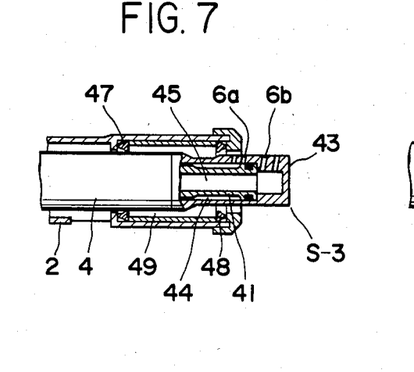
FIG. 7 is a fragmentary longitudinal sectional view of the nozzle in its self-cleaning position.
Figure 8:
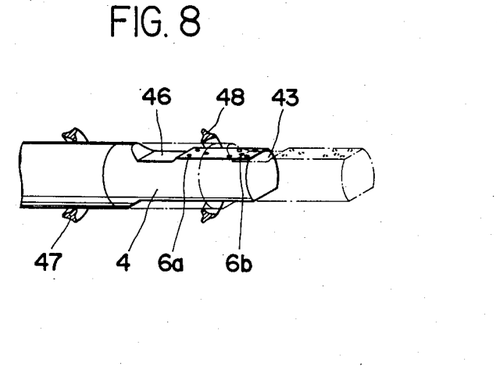
FIG. 8 is a perspective view showing a nozzle distal end and a first and a second packing members.

If the nozzle body 4 stops at its self-cleaning position S-3, the nozzle head 43 is displaced outwardly relative to the packing members 47 and 48 and projects from the cylinder 2, as shown in FIG. 7. The second packing member 48 leaves the shoulders 46 on the nozzle head 43. The annular passage 49 communicates to the atmosphere through the annular opening between the second packing member 48 and the nozzle head 43 and water is discharged at a reduced pressure for cleaning the nozzle head 43 and the adjacent end of the cylinder 2 to keep them clean both before and after the toilet is used. As the pressure of the discharged water for self-cleaning is reduced, water flows along the nozzle head 43 and the adjacent end of the cylinder 2 slowly and does not undesirably jet out from the annular passage 49 into the bowl B-1 or splash out of the water closet B.

The nozzle body 4 does not necessarily need to be of the type having two water supply routes for cleaning the anus and for the use as a bidet, respectively, as hereinabove described. The first and second packing members 47 and 48 defining the annular passage 49 in the cylinder 2 do not necessarily need to have a Y-shaped cross section, but may have another cross sectional shape, for example, a U-shaped cross section.

Figure 9:
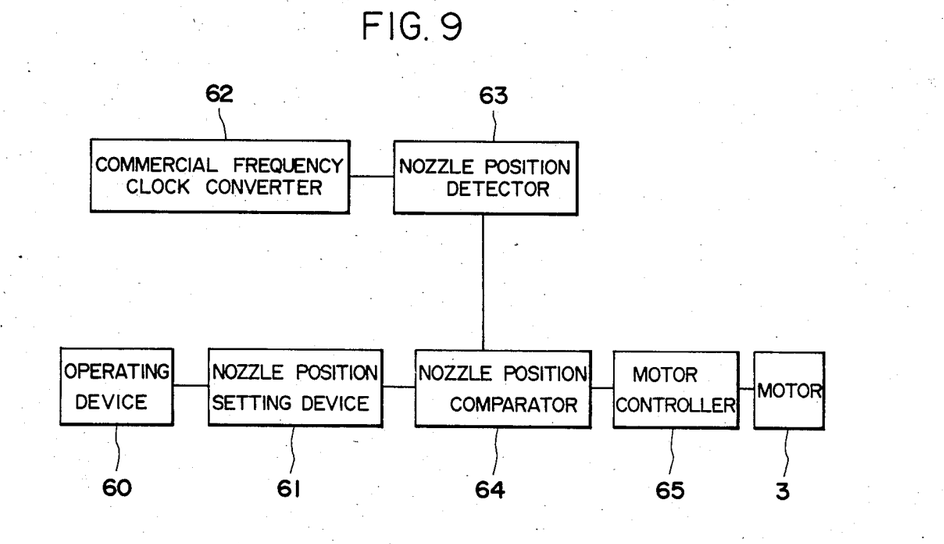
FIG. 9 is a block diagram showing a control circuit for an electric motor.

A method of controlling the position of the nozzle body 4 will now be described with reference to FIG. 9. The block diagram of FIG. 9 includes a pushbutton or other operating device 60 provided in the vicinity of the part cleaning device, a nozzle position setting device 61 connected to the operating device 60, a commercial frequency clock converter 62 provided in the vicinity of the power source for the motor 3, a nozzle position detector 63 connected to the converter 62 and a nozzle position comparator 64 connected to the devices 62 and 63. The anus cleaning position S-1, the functioning position as a bidet S-2 and the self-cleaning position S-3 of the nozzle body 4 are stored in the nozzle position setting device 61 and each compared with the actual position of the nozzle body 4 which is detected by the nozzle position detector 63. The power circuit for the motor 3 is connected to the nozzle position comparator 64 through a motor controller 65 which turns on or off the supply of power to the motor 3 in response to the output of the comparator 64.

Figure 10:
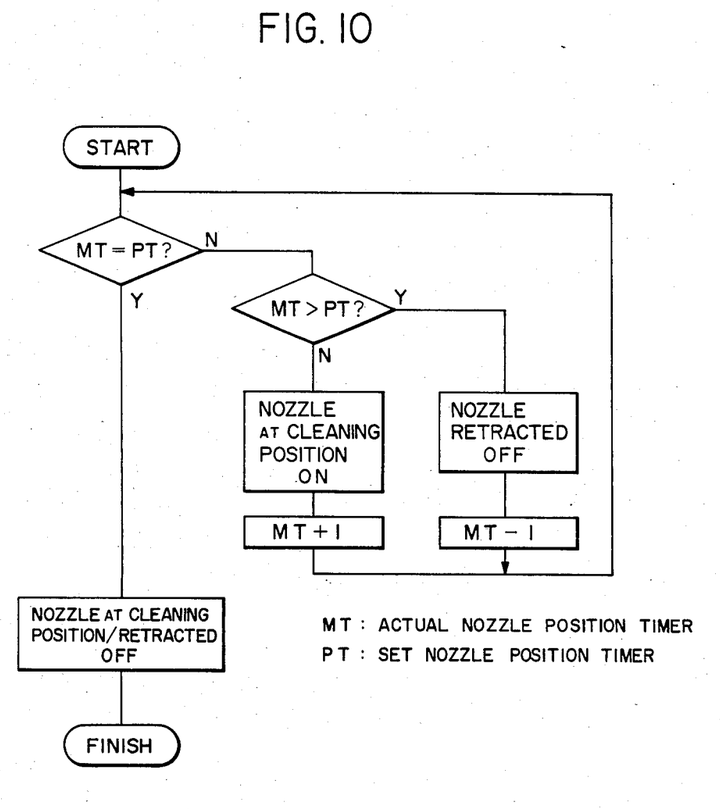
FIG. 10 is a flow chart showing the operation of the motor.

The flow chart of FIG. 10 showing a system for controlling the movement of the nozzle body 4 includes an actual nozzle position timer MT and a set nozzle position timer PT. If the operating device 60 is actuated to turn on the power circuit for the motor 3, its output shaft 11 is rotated to unwind the leaf spring 12 from the drum 10 and move the nozzle body 4 forward to its cleaning position. The number of cycles of the frequency of the power source starts to be counted simultaneously with the turning on of the power circuit. When the nozzle body 4 has reached one of its cleaning positions, the power circuit is turned off to discontinue the rotation of the motor 3 and stop the nozzle body 4 as its designated anus cleaning position S-1 or functioning position as a bidet S-2, as shown in FIG. 3.

When the nozzle body 4 is moved back to its retracted position S-4 in the cylinder 2, the motor 3 is kept in operation for several more cycles even after the counted number of cycles indicating the actual position of the nozzle body 4 has coincided with a set value representing its retracted position S-4. This ensures the return of the nozzle body 4 to its completely retracted position S-4 and eliminates its inaccurate positioning which might otherwise result from the repeated operation of the motor 3. A similar control system is used for positioning the nozzle body 4 relative to its self-cleaning position S-3.

The motor 3 is a synchronous type and therefore, the nozzle body 4 may be accurately positioned if the frequency of the power source is counted. However, because incorrect positioning is possible, a pair of stop members 70 and 71 are provided in the cylinder 2 to ensure that the nozzle body 4 is stopped at its retracted position S-4 or at its functioning position as a bidet S-2.

If required, a semiconductor control device may be employed to enable the motor 3 to start when the voltage of the power source is zero. This arrangement eliminates any error in the counting of the number of cycles and improves the accuracy of nozzle positioning control.

The use of the precision cylindrical drum 10 and the leaf spring 12 for converting the rotation of the motor 3 to the axial reciprocating movement of the nozzle body 4 enables the accurate conversion of the amount and angle of rotation of the output shaft 11 to the amount of movement of the nozzle body 4. This feature permits the use of a nozzle position sensor for the accurate positioning of the nozzle body 4 as shown in FIG. 11.

Figures 11, 12:
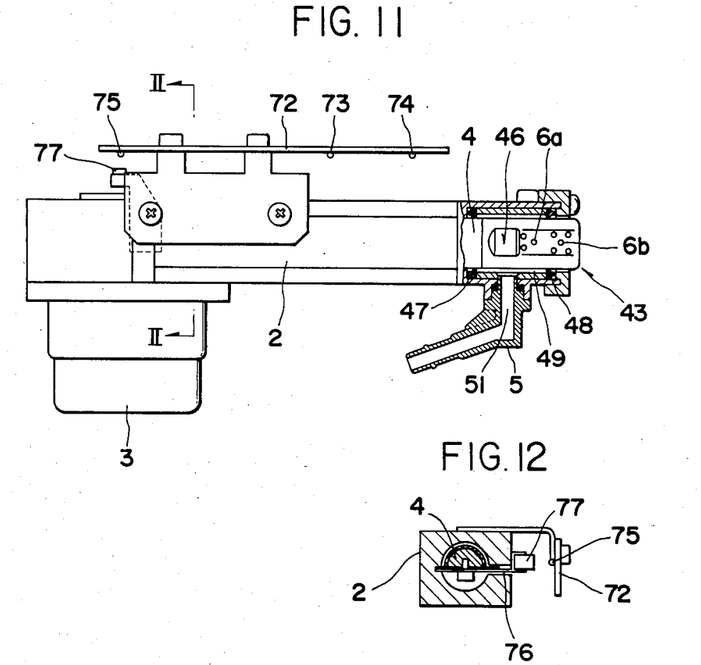
FIG. 11 is a top plan view, partly in section, of the nozzle device of which the positioning is effected by lead switches and a magnet.
FIG. 12 is a sectional view taken along the line II—II of FIG. 11.

Referring to FIG. 11, a frame 72 is secured along one side of the cylinder 2 and has an inner surface on which lead switches 73, 74 and 75 are provided for detecting each position of the nozzle body 4 when it is in its anus cleaning position S-1, functioning position as a bidet S-2, and retracted position S-4, respectively. The cylinder 2 is formed on the one side thereof with a recess 76. A magnet 77 which faces one of the lead switches 73 to 75 depending on the position of the nozzle body 4 is secured to the nozzle body 4 and exposed through the recess 76. When the magnet 77 has come to one of the lead switches 73 to 75 during the movement of the nozzle body 4, a corresponding signal is transmitted to the control system for the motor 3 to enable the detection of the nozzle position and its accurate positioning.

Figure 13:
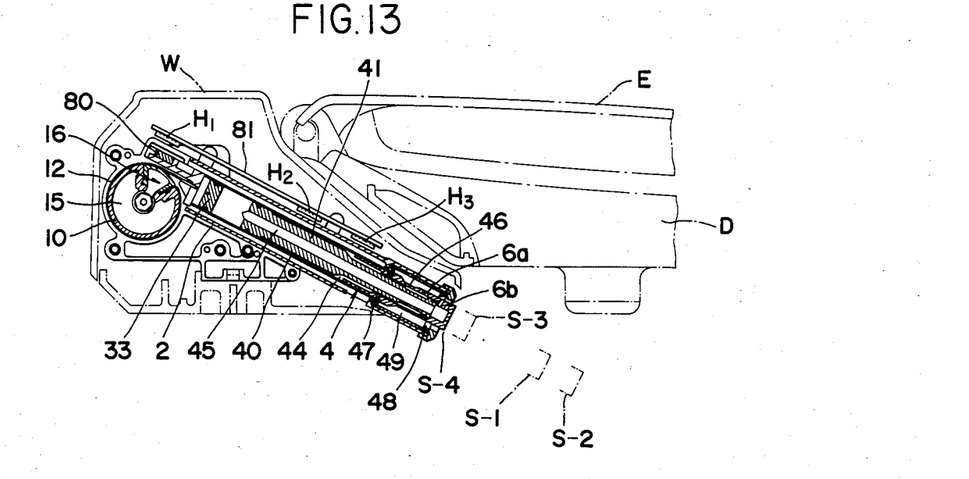
FIG. 13 is a longitudinal sectional view of the nozzle device of which the positioning is effected by Hall ICs and a magnet.
Figure 14:
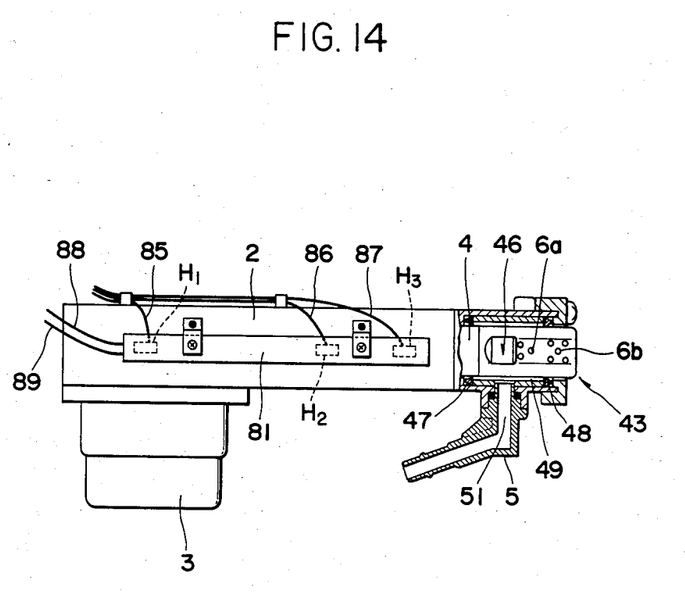
FIG. 14 is a top plan view, partly in section, of the nozzle device shown in FIG. 13.

Another arrangement for positioning the nozzle body 4 is shown in FIGS. 13 and 14. It employs Hall ICs for detecting the position of the nozzle body 4 in motion instead of the lead switches as mentioned above. Such arrangement includes a magnet 80 mounted on the proximal end of the nozzle body 4 in such a way that the directions of both poles thereof may be perpendicular to the direction of axial movement of the nozzle body 4.

Three Hall ICs $H_1$, $H_2$ and $H_3$ are provided for detecting the position of the nozzle body 4 in cooperation with the magnet 80. The Hall ICs $H_1$ to $H_3$ are mounted on the inner surface of the upper plate 81 of the cylinder 2 in parallel to the nozzle body 4 and in a way forming a perpendicular magnetic field with the magnet 80. The first to third Hall ICs H1 to $H_1$ to $H_3$ are so situated as to face the magnet 80 when the nozzle body 4 has reached its retracted position S-4, anus cleaning position S-1, and functioning position as a bidet S-2, respectively.

The Hall ICs are turned on or off by a magnetic field as is known in the art. The Hall ICs $H_1$ to $H_3$ are switched on or off when the magnet 80 creates a magnetic field of intensity above a certain level. They produce a low output voltage when switched on, and a high output voltage when switched off.

Figure 15:
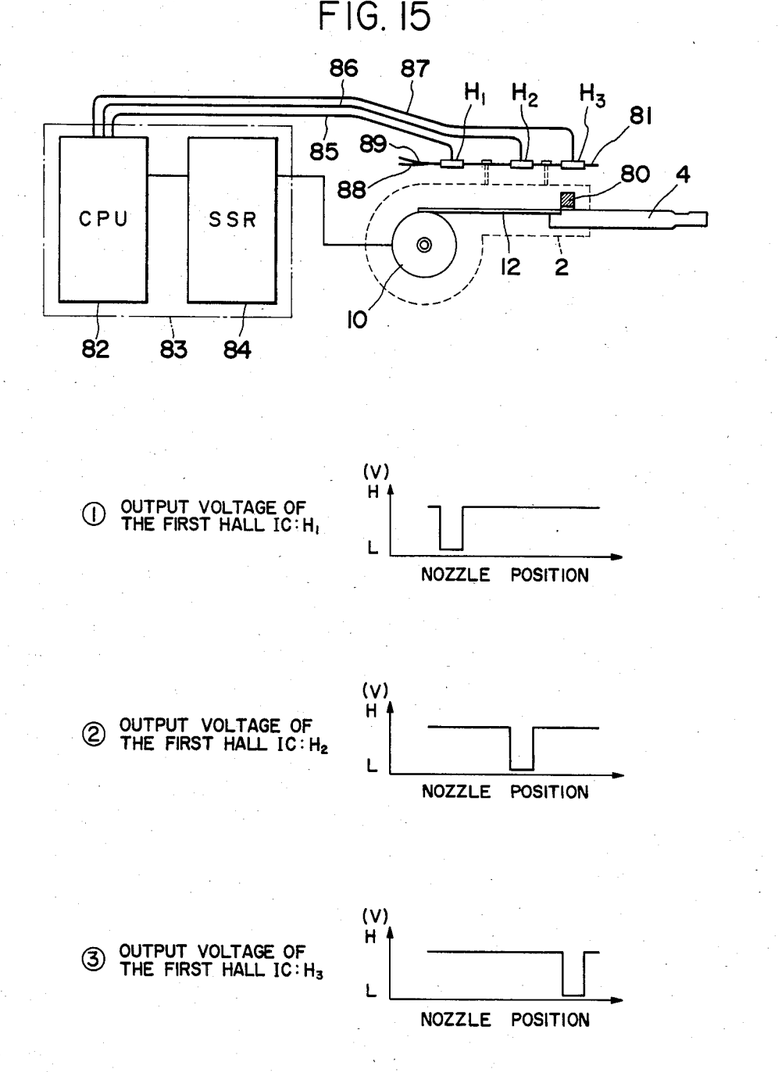
FIG. 15 shows the principle of nozzle position detection by a magnet and Hall ICs.

FIG. 15 shows the principle of nozzle position control by the Hall ICs $H_1$ to $H_3$ and the magnet 80. The system of FIG. 15 includes a central processing unit (CPU) 82 in a system 83 provided in the part cleaning device A for controlling all of the electrical components thereof, and a solid-state relay 84 for controlling the supply of power to the motor 3, a cleaning water heater, a heater for warming the toilet seat, a heater for the hot air fan H and the electromagnetic valve in the piping. The Hall ICs $H_1$ to $H_3$ are connected to the CPU 82 by position signal lines 85 to 87, respectively. Lead wires 88 and 89 are connected to the upper plate 81 of the cylinder 2 for supplying an electric current to the Hall ICs $H_1$ to $H_3$.

In order to move the nozzle body 4 forward from its retracted position S-4 as shown in FIG. 13 to its anus cleaning position S-1, the cleaning start switch 53 on the control panel 52 is turned on and the motor 3 is started in response to a signal from the CPU 82 to release the leaf spring 12 from the drum 10, whereby the nozzle body 4 is moved forward. If the nozzle body 4 reaches its anus cleaning position S-1, the second Hall IC $H_2$ faces the magnet 80 and is turned on at a low output voltage as shown by graph (2) in FIG. 15. Its output is fed back to the CPU 82 and the CPU 82 determins the Hall IC from which it has received the output signal. If it determines the signal as having been received from the second Hall IC $H_2$, it discontinues the supply of power to the motor 3. The nozzle body 4 is held at its anus cleaning position S-1 and the electromagnetic valve, or the like is opened to jet out cleaning water. If the anus has been cleaned, the stop switch 54 is operated. The CPU 82 transmits a signal to the motor 3 to rotate it in the opposite direction to retract the nozzle body 4 into the cylinder 2. When the magnet 80 has come to face the first Hall IC $H_1$, it produces a low output voltage as shown by graph (1) in FIG. 15 and in response to the output of the Hall IC $H_1$, the CPU 82 stops the rotation of the motor 3, whereby the nozzle body 4 is held in its retracted position within the cylinder 2.

The start switch for a bidet 55 is turned on to move the nozzle body 4 to its functioning position as a bidet S-2. The magnet 80 cooperates with the third Hall IC $H_3$ to position the nozzle body 4 in its functioning position as a bidet S-2. The stop switch 54 may be depressed to retract the nozzle body 4 into the cylinder 2.

An additional Hall IC or ICs may be employed to provide an additional cleaning position or positions. The use of Hall ICs is convenient for enabling the detection of the nozzle body in a plurality of cleaning positions. Moreover, the Hall ICs, which do not have any contact, are easier to handle, assemble and mount than the lead switches.

According to this invention, the use of lead switches 10 or Hall ICs does not present any problem in the position control of the nozzle body 4, since the leaf spring 12 on the precision cylindrical surface of the drum 10 converts the rotation of the output shaft 11 of the motor 3 accurately to the axial movement of the nozzle body 4.

In addition to the various advantages of this invention as hereinabove set forth, it is also useful to remove cold water from the cleaning water supply pipe and wet the first and second packing members 47 and 48 prior to the use of the device for its primary purposes in order to reduce their frictional resistance to the movement of the nozzle body 4 and prolong the life of the packing members 47 and 48.

What is claimed is:

1. A device for moving a cleansing nozzle connected to a water supply system comprising an elongated nozzle, a structure having a cylinder in which said nozzle is axially slidable, a motor mounted on said structure, said motor having an output shaft, a drum body mounted on said output shaft, said drum body having a cylindrical rim surface and a sectoral recess extending from said rim surface, a sectoral insert disposed in said recess and having a partial cylindrical surface conforming to and forming a continuation of said cylindrical rim surface, and a leaf spring having one end connected to said nozzle and the other end held between said drum body and said sectoral insert, whereby rotation of said drum body extends and withdraws said nozzle longitudinally as said leaf spring unwraps and wraps around said drum body.

2. A device according to claim 1, wherein said cylinder has stop means adapted to engage said nozzle to limit the extent of movement of said nozzle in said cylinder.

3. A device according to claim 1 further comprising heating means on said structure for heating water supplied to said nozzle by said water supply system.

4. A device according to claim 1, wherein said nozzle has outlet openings for spraying out water, said nozzle being movable between a retracted and an extended position, said water being sprayed out of said outlet openings when said nozzle is in said extended position.

5. A device according to claim 4, wherein said nozzle is movable to an intermediate position between said retracted and said extended positions, said water being sprayed out of said outlet openings when said nozzle is in said intermediate position.

6. A device according to claim 4 further comprising control means for controlling said motor to position said nozzle at said retracted and extended positions.

7. A device according to claim 4, wherein said control means comprises sensors on said nozzle and on said cylinder for determining the retracted and extended positions of said nozzle.

8. A device according to claim 1 further comprising a toilet bowl, said nozzle being operative within said toilet bowl as a body cleansing nozzle.

9. A method of controlling the position of a slidable nozzle connected to a water supply system wherein the nozzle is lfngitudinally slidable in a cylinder by a leaf spring which has one end connected to the nozzle and the other end mounted on and operative to wrap about a drum driven by a synchronous motor, the method comprising the steps of counting the number of cycles of the frequency of the electric power supplied to said synchronous motor, determining the actual position of said nozzle on the basis of said counted pulses, establishing a predetermined position of said nozzle, comparing said actual position with said predetermined position, and transmitting the results of said comparison to a power circuit for said motor to turn said motor on and off so that the motor thereby positions said slidable nozzle at said predetermined position.

10. A method according to claim 9 further comprising placing said motor in operation when said power circuit has zero voltage.

11. A method according to claim 9 further comprising heating the water supplied to said nozzle.

12. A method according to claim 9 further comprising moving said nozzle between a retracted and an extended position, and spraying out water from said nozzle when said nozzle is in said extended position.

13. A method according to claim 12 further comprising moving said nozzle to an intermediate position between said retracted and said extended positions.

14. A method according to claim 13 further comprising temporarily stopping said nozzle at said intermediate position while being moved from said retracted to said extended position.

15. A method according to claim 9, wherein said slidable nozzle is slidable in a toilet bowl to provide for body cleansing.

* * * * *